United States Patent
Pittman

(10) Patent No.: US 6,902,447 B1
(45) Date of Patent: Jun. 7, 2005

(54) ROTARY WIND-POWERED PROPULSION SYSTEM FOR BOATS

(76) Inventor: Grover C. Pittman, 241 Riverside Dr., Centerville, AL (US) 35042

( * ) Notice: Subject to any disclaimer, the term of this patent is extended or adjusted under 35 U.S.C. 154(b) by 0 days.

(21) Appl. No.: 10/834,206

(22) Filed: Apr. 29, 2004

(51) Int. Cl.$^7$ ................................................ B63H 9/00
(52) U.S. Cl. ......................................................... 440/8
(58) Field of Search ...................................... 440/8, 75

(56) References Cited

U.S. PATENT DOCUMENTS

| | | | |
|---|---|---|---|
| 2,972,327 A | | 2/1961 | Paul |
| 3,212,470 A | * | 10/1965 | Wiggin ........................... 440/8 |
| 3,270,827 A | | 9/1966 | Mantle |
| 4,005,673 A | | 2/1977 | Carrero |
| 4,015,555 A | | 4/1977 | Tinkham |
| 4,371,346 A | * | 2/1983 | Vidal ............................. 440/8 |
| 4,419,587 A | * | 12/1983 | Benton ......................... 290/44 |
| 4,522,600 A | * | 6/1985 | Jost ............................... 440/8 |
| 5,082,465 A | | 1/1992 | Wine |
| 5,083,538 A | | 1/1992 | Hubbell |
| 6,341,571 B1 | | 1/2002 | Russell et al. |
| 6,413,125 B1 | | 7/2002 | Duer |

* cited by examiner

Primary Examiner—Stephen Avila
(74) Attorney, Agent, or Firm—John D. Gugliotta; Olen L. York, III

(57) ABSTRACT

A propulsion drive system for boats that is operated by wind power is disclosed. Upon initial observation of a boat equipped with the invention, it looks like a conventional boat. However, after closer inspection, it can be seen that a mast located at the rear of the boat supports a windmill structure. The windmill operates in a horizontal manner, similar to that of an anemometer. The central drive shaft is routed down the mast where it terminates in a gear box which increases the revolutions per minute by a factor of approximately 20 to 1. The output of the gearbox, complete with a clutch, is then routed to a propellor on the rear of the boat which is then used in a conventional manner. The features of the invention provide all of the advantages of a wind-powered boat without any of the disadvantages.

13 Claims, 6 Drawing Sheets

US 6,902,447 B1

ROTARY WIND-POWERED PROPULSION SYSTEM FOR BOATS

RELATED APPLICATIONS

The present invention was first described in Disclosure Document Number 537,681 filed on Sep. 2, 2003 under 35 U.S.C. §122 and 37 C.F.R. §1.14. There are no previously filed, nor currently any co-pending applications, anywhere in the world.

BACKGROUND OF THE INVENTION

1. Field of the Invention

The present invention relates generally to propulsion systems for boats, and, more particularly, to a rotary wind-powered propulsion system for boats.

2. Description of the Related Art

Wind power has been used to power boats since the beginning of mankind. Wind power for this application is powerful, abundant, and limitless, the perfect combination for a power source. However, to harness such energy, the use of sails is required. As anyone who has ever been on a sailboat quickly realizes, a good deal of knowledge and skill is required to operate and control such a boat. Also, the sails, mast, raising and lowering gear, and the like, take up valuable deck space whether or not they are in use. Additionally, much valuable time can be lost while "tacking" or sailing into the direction of the wind. Finally, the use of sails is only effective on large lakes and oceans, and thus cannot be used on rivers, small lakes, and the like.

Consequently, there exists a need for a means by which the benefits of sailing such as free energy, no pollution, no noise and the like can be realized without any of the disadvantages as listed above.

SUMMARY OF THE INVENTION

It is therefore an object of the present invention to provide an improved propulsion systems for boats.

It is a feature of the present invention to provide an improved rotary wind-powered propulsion system for boats.

Briefly described according to one embodiment of the present invention, an air power drive for boats is a drive system for boats that is operated by wind power. Upon initial observation of a boat equipped with the invention, it looks like a conventional boat. However, after closer inspection, it can be seen that a mast located at the rear of the boat supports a windmill structure. The windmill operates in a horizontal manner, similar to that of an anemometer. The central drive shaft is routed down the mast where it terminates in a gear box, which increases the revolutions per minute by a factor of approximately 20 to 1. The output of the gearbox, complete with a clutch, is then routed via a flexible linkage such as a universal joint to a propeller on the rear of the boat, which is then used in a conventional manner.

The features of the invention provide all of the advantages of a wind-powered boat without any of the disadvantages.

The use of the Air Power Drive for Boats provides a means to take advantage of wind power on a boat in a manner, which is easy to use and control, economical, and environmentally friendly too.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the FIGS. 1 through 9.

1. Detailed Description of the Figures

Figure 1:
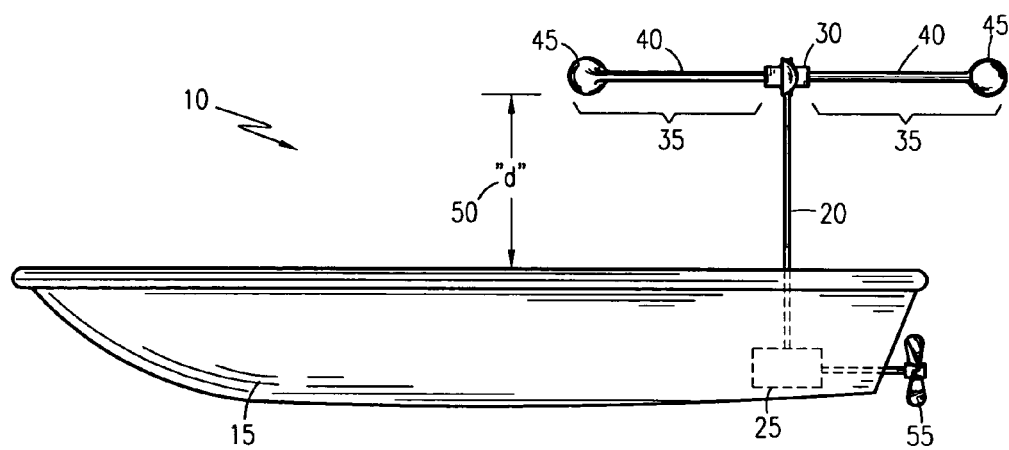
FIG. 1 is a side view of the rotary wind-powered propulsion system for boats 10 installed upon a boat 15, according to a preferred embodiment of the present invention.

Referring now to FIG. 1, a side view of the rotary wind-powered propulsion system or apparatus for a boat 10, installed upon a boat 15, is disclosed according to the preferred embodiment of the present invention. It should be noted that the size of the boat 15 is not a limiting factor of the present invention, and the rotary wind-powered propulsion system or apparatus 10 is suitable for use on boating vessels from the size of a small rowboat to a large military naval vessel by simply scaling the size of the components. At the rear of the boat 15 a main vertical shaft 20 is provided along the longitudinal center axis of the boat 15. The bottom end or inferior terminus of the main vertical shaft 20 terminates in a gear box housing 25 on the interior of the boat 15 and thus shown via phantom lines for purposes of clarity. The gear box housing 25 will be disclosed in additional detail herein below. The upper end or superior terminus of the main vertical shaft 20 terminates in a central hub 30. A series of four mast swing arms 35 emanates or radiates from the central hub 30 at an angle of 90 degrees to each other, thus permitting the viewing of three in this FIG. Each mast swing arm 35 includes a horizontal extension arm 40 and a wind cup 45 affixed at a distal end of the arm 40. The horizontal extension arm 40 is located at an angle of 90 degrees to the main vertical shaft 20. The wind cup 45 is located at the outward end of each horizontal extension arm 40. It should be noted that a mounting height "d" 50 of the mast swing arms 35 above the boat 15 is such that it will not cause a danger to people who may be sitting or standing in the boat 15 regardless of its size. A propellor 55 is provided as the final drive component of the rotary wind-powered propulsion system for boats 10 which propels the boat 15 through the water in a conventional manner.

Figure 2:
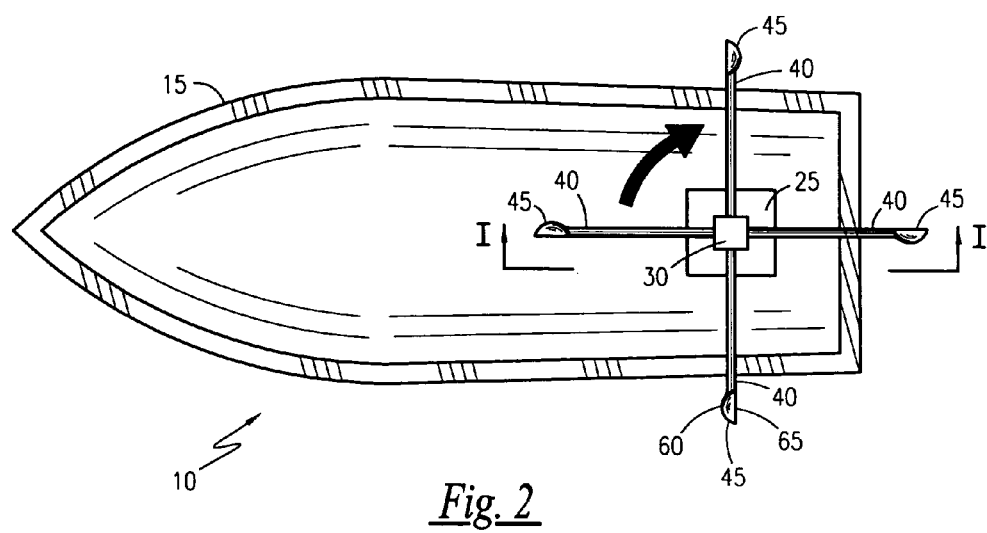
FIG. 2 is a top view of the rotary wind-powered propulsion system for boats 10.

Referring next to FIG. 2, a top view of the rotary wind-powered propulsion system for boats 10 is disclosed. This FIG. clearly depicts the 90 degree relationship of each horizontal extension arm 40 and wind cup 45 to each other. The wind cup 45 are positioned as shown to allow the capture of wind power regardless of wind direction. The convex surface 60 surface of the wind cup 45 allows wind to flow over said surface with a minimum of resistance or turbulence. The concave surface 65 surface of the wind cup 45 captures the wind and causes the wind to push or move the wind cup 45 and subsequent horizontal extension arm 40 in the direction of the wind. Thus it can be seen that no matter which way the wind is blowing, a wind cup 45 will be positioned with its concave surface 65 exposed to it, and another wind cup 45 positioned 180 degrees away will be positioned with its convex surface 60 to it. In such a manner the central hub 30 will rotate in the direction of a direction arrow 70 as shown. Such rotation will occur regardless of the direction of the boat 15, thus minimal skill to operate the rotary wind-powered propulsion system for boats 10 is required. The rotation of the wind cups 45 results in the rotation of the hub 30 and rotation of shaft 20 in the direction of the air flow. The rotational energy generated is transferred from shaft 20 through gearbox housing 25 and to the propellor 55, thereby mobilizing the boat or vessel. The rotation is well-known in the art and is commonly used on anemometer-style wind measuring and wind mill type devices. The task of having to "tack" into the wind is no longer necessary, thus travel distance and travel time is reduced. Also, the rotary wind-powered propulsion system for boats 10 can be used on small lakes and even rivers which are locations that are not feasible or even possible for conventional styled sail boats. Additionally, the rotary wind-powered propulsion system for boats 10 does not produce environmental or noise pollution thus making it ideal for use in areas where there are restrictions on the use of fossil-fuel powered propulsion systems with regards to environmental or noise issues. Such operation is environmentally friendly and does not consume any non-renewable resources. Finally, the low-noise, or no-noise operation of the rotary wind-powered propulsion system for boats 10 makes it ideal for use in military situations where stealth operation is a concern such as when approaching enemy territory via a water-based access point.

Figure 3:
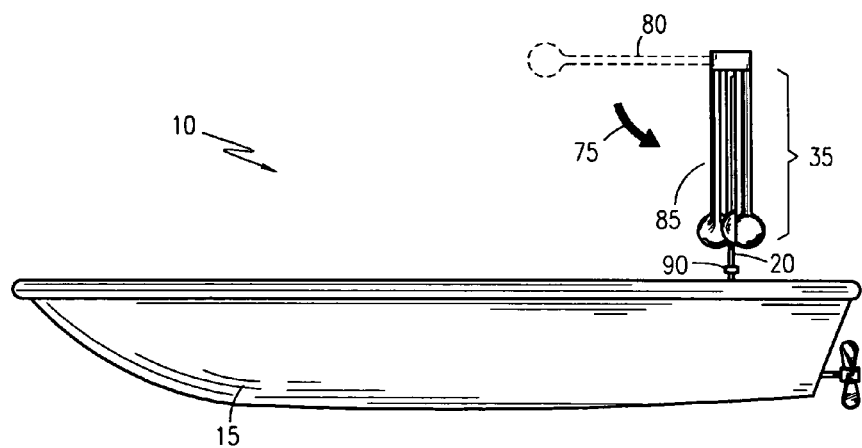
FIG. 3 is a side view of the rotary wind-powered propulsion system for boats 10 shown in a retracted or stowed state, upon the boat 15.

Referring now to FIG. 3, a side view of the rotary wind-powered propulsion system for boats 10, shown in a stowed or retracted state upon the boat 15 is disclosed. Said configuration would be used while anchored, docked or not moving. Each mast swing arms 35 folds downward as indicated by a travel path 75 from a raised position 80 (shown via phantom lines) to a lowered position 85. It is also envisioned on smaller boats that the main vertical shaft 20, the central hub 30, and the mast swing arms 35 could be completely removed and set inside of the boat 15 in a horizontal fashion, by removing the main vertical shaft 20 from a coupling 90. Due to the fact that the main vertical shaft 20, the central hub 30 and the mast swing arms 35 are relatively small in nature compared to conventional fabric sails, the utilization of the rotary wind-powered propulsion system for boats 10 as an emergency propulsion system could also be entertained. Thus, the failure of a primary propulsion system such as a fossil-fuel powered engine could be remedied by the use of the rotary wind-powered propulsion system for boats 10.

Figure 4:
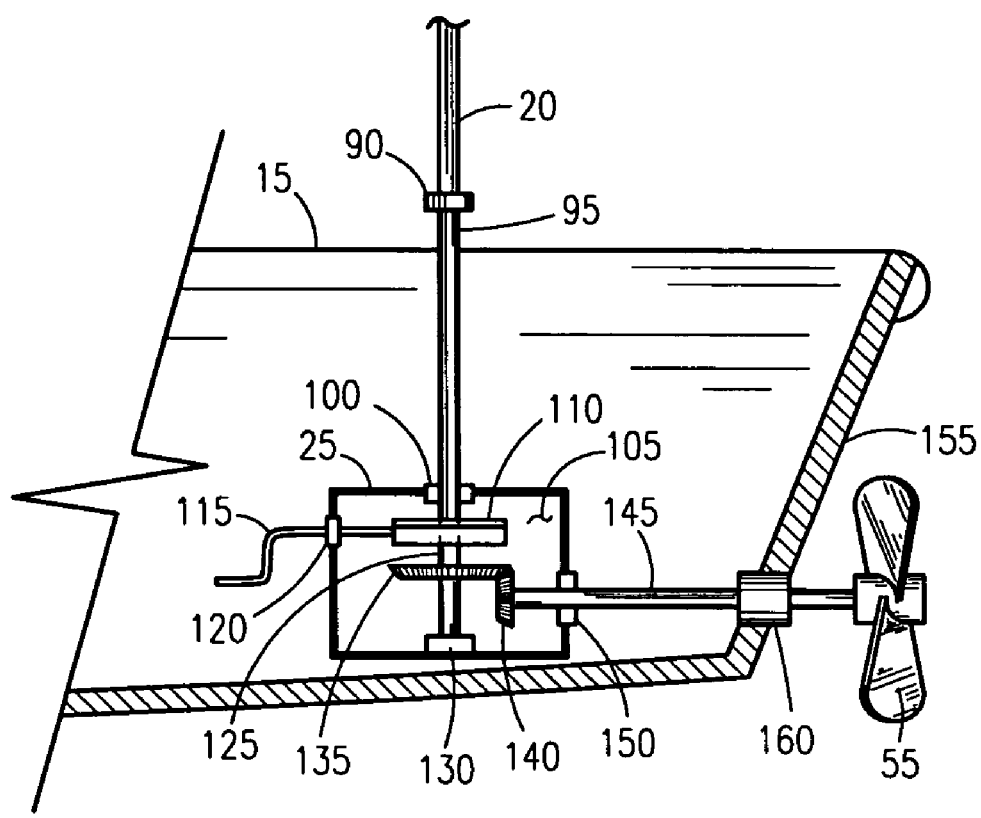
FIG. 4 is a sectional view of the rotary wind-powered propulsion system for boats 10 as seen along a line I—I shown in FIG. 2.

Referring finally to FIG. 4, a sectional view of the rotary wind-powered propulsion system for boats 10, as seen along a line I—I, as shown in FIG. 2 is depicted. The main vertical shaft 20 enters the coupling 90, envisioned to be a slip joint-type coupling. A small shaft 95 then enters the gear box housing 25 via a first bearing seal 100, which is designed to support the small shaft 95 and subsequent main vertical shaft 20 along with the central hub 30 (not shown in this FIG.) and the associated mast swing arms 35 (not shown in this FIG.) The first bearing seal 100 also seals in lubricating medium 105 such as grease or oil, while sealing out water that may splash in the boat 15. The small shaft 95 then continues onto a speed reduction mechanism 110 such as a clutch which allows the user to reduce the speed of the boat 15 in relation to the wind speed. Various speed reduction mechanisms 110 such as a mechanical clutch, a magnetic clutch, a friction-based clutch or the like could be used, and is not intended as a limiting factor of the present invention. The adjustment range of the speed reduction mechanism 110 is governed by a speed adjustment lever 115 operating through a second bearing seal 120. The output of the speed reduction mechanism 110 is transmitted by a speed controlled output 125 which rests upon the bottom of the gear box housing 25 and boat 15 with the use of a support bearing 130. The support bearing 130 supports the weight of all components located above it, such as the speed controlled output 125, the speed reduction mechanism 110, the small shaft 95, and the main vertical shaft 20. Additionally, the weight of the central hub 30, and the mast swing arms 35 (as shown in FIGS. 1, 2 and 3) is supported as well. A large diameter gear 135 is located and in firm mechanical contact with the speed controlled output 125. Said large diameter gear 135 feeds a small diameter gear 140 at a 90 degree angle as shown. The size ratio of the large diameter gear 135 to the small diameter gear 140 is envisioned to be 20 to 1. Thus, for every rotation of the main vertical shaft 20, not limited by the speed reduction mechanism 110, a propellor shaft 145 will turn 20 times. The propellor shaft 145 is routed through a third bearing seal 150 and through a boat hull 155 with the use of fourth bearing seal 160 where it will turn the propellor 55. It should be noted that the main purpose of the gear box housing 25 is to convert the rotational energy of the main vertical shaft 20 into a form of rotational energy that can be governed and used by the propellor 55. Said conversion occurs with a minimum of moving parts thus keeping the design simple and dependable.

Figure 5:
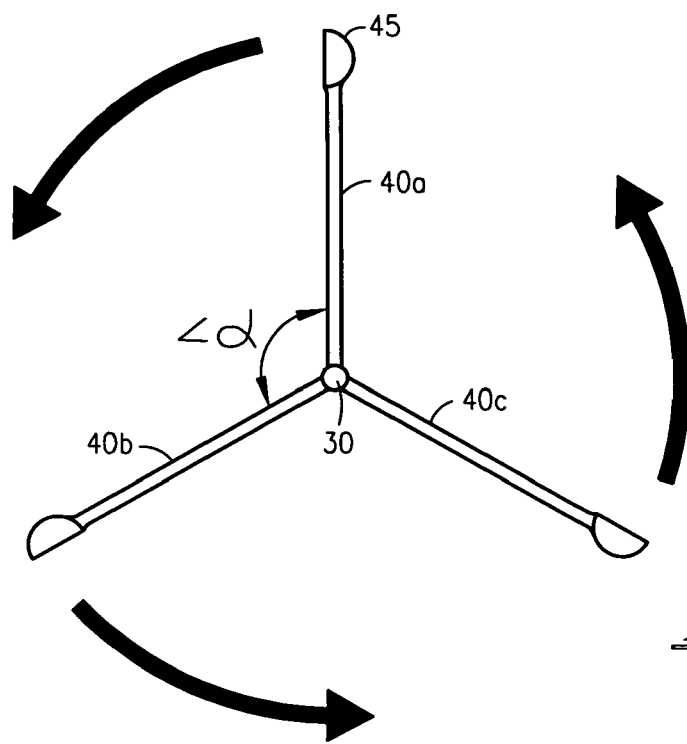
FIG. 5 is a top view of a three-arm embodiment of the swing arms.
Figure 6:
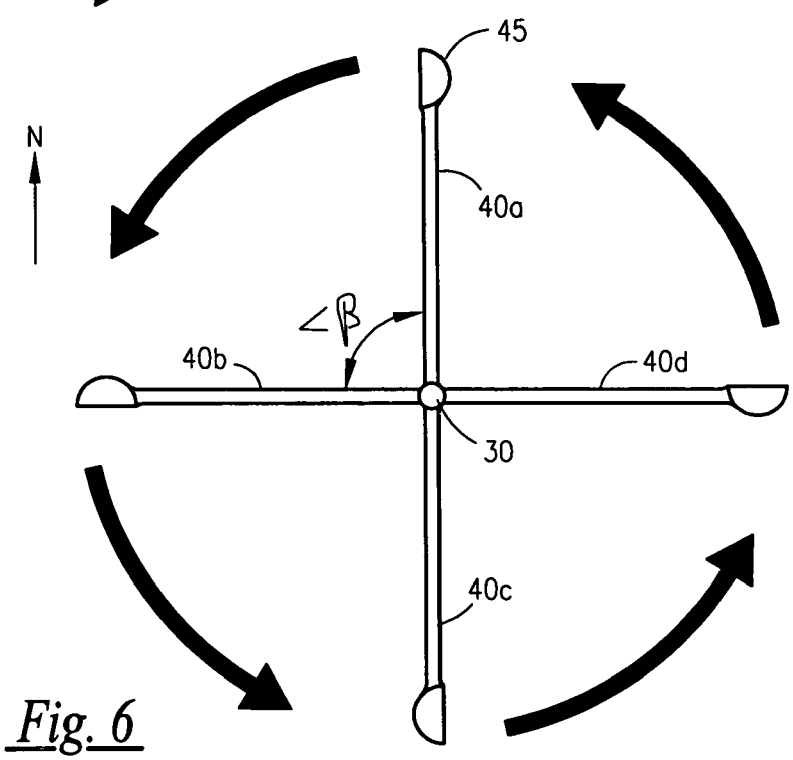
FIG. 6 is a top view of a four-arm embodiment of the swing arms.

Referring now to FIG. 5 and FIG. 6, alternate embodiments of the arms 40 are depicted. In FIG. 5, a three arm (40a, 40b and 40c, respectively) embodiment is depicted, wherein each arm 40a, 40b or 40c is equidistant from adjacent arms and are set at an angle $\angle\alpha$ that is approximately 120°. The wind cups 45 of each respective arm are aligned facing in the same axial direction, as indicated by the directional arrows in FIG. 5. In this example, the wind cups 45 are aligned to face the counterclockwise direction (as viewed looking down onto the figure), but it is intended that the clockwise directional alignment is also desirable. In FIG. 6, a four arm (40a, 40b, 40c and 40d, respectively) embodiment is depicted, wherein each arm 40a, 40b, 40c or 40d is equidistant from adjacent arms and are set an angle $\angle\beta$ that is approximately 90°. The wind cups 45 of each respective arm are aligned facing the same axial direction, as indicated by the directional arrows in FIG. 6. In this example, the wind cups 45 are aligned to face the counterclockwise direction as in FIG. 5. The first arm 40*a* and the third arm 40*c* are co-axially aligned about the hub 30. The respective wind cups 45 are aligned facing opposing compass directions (the compass direction North provided for reference in FIG. 6). Thus, the wind cup 45 of the first arm 40*a* is aligned facing the compass direction West, and the wind cup 45 of the third arm 40*c* is aligned facing the compass direction East. Likewise, the wind cup 45 of the second arm 40*b* is aligned facing the compass direction South, and the wind cup 45 of the fourth arm 40*d* is aligned facing the compass direction North. Obviously, the directional alignment provided in the figure is for illustrative purposes only, and the directional alignment may differ without departing from the intention and scope of the feature as it relates to the invention.

Figure 7:
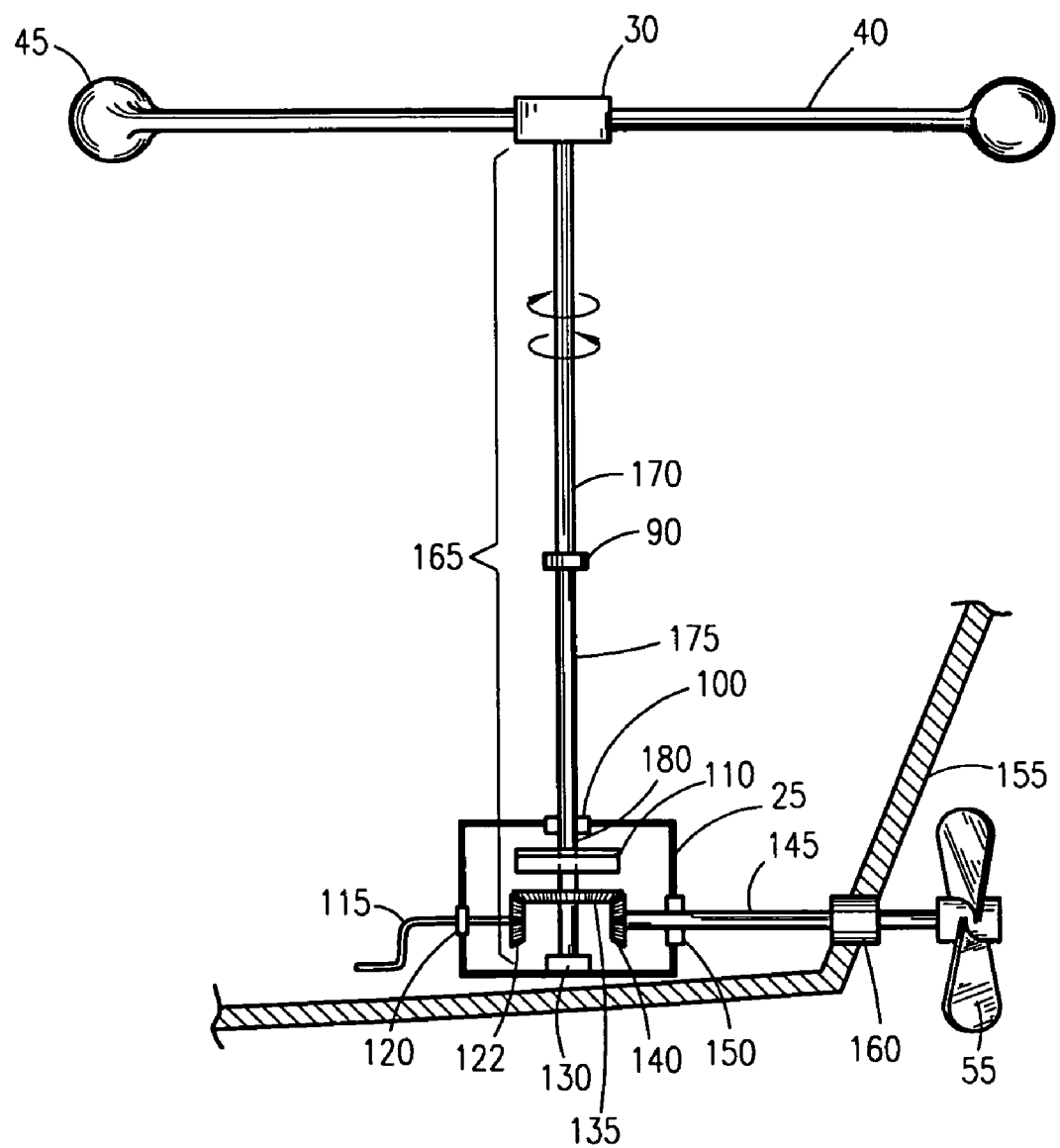
FIG. 7 is a side view of an alternate embodiment having a multi-shaft assembly.

Referring now to FIG. 7, an alternate embodiment of the invention is depicted in which a single shaft is replaced by a multiple-shaft, vertical shaft assembly 165 is provided. The shaft assembly 165 comprises a superior shaft 170, an intermediate shaft 175 and an inferior shaft 180. The superior shaft 170 engages the intermediate shaft 175 by a coupling 90. The intermediate shaft 175 engages the inferior shaft 180 by a first bearing seal 100. The inferior shaft 180 is supported at the base of the gearbox housing 25 by a support bearing seal 130. The inferior shaft 180 engages the mechanism 110, and is controlled by lever 115 as described previously. The inferior shaft 180 also engages a large diameter gear 135 that engages a small diameter gear 140. Thus, the inferior shaft 180 traverses the gearbox housing 25 from top to bottom, penetrating the mechanism 110 and the gear 135. The small diameter gear 140 engages the propellor shaft 145, the propellor shaft 145 penetrating the third bearing seal 150 of the gearbox and the fourth bearing seal 160 of the boat hull. The propellor shaft 145 depends from the propellor 55. Rotational energy is transferred through the sequence to impart rotation on the propellor and provide mobility to the boat. As described in greater detail in relating to FIG. 9, the shaft assembly 165 may be disassembled so that the superior shaft 170 is removed from the intermediate shaft 175 for storage and safety. The lever 115 is coupled to the large gear 135 via a small diameter gear 122. Therefore, the lever 115 may be used to supply power to the propellor by rotation of the lever 115 manually by the user.

Figure 8:
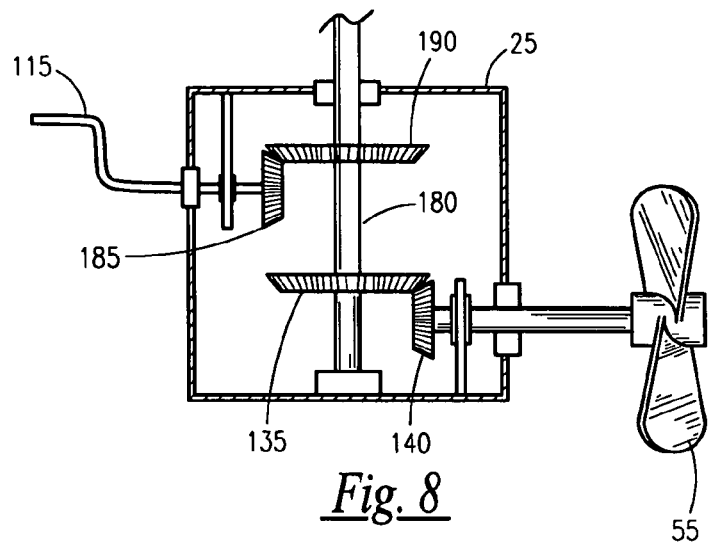
FIG. 8 is a cut-away side view of the gearbox housing with hand crank.
Figure 9:
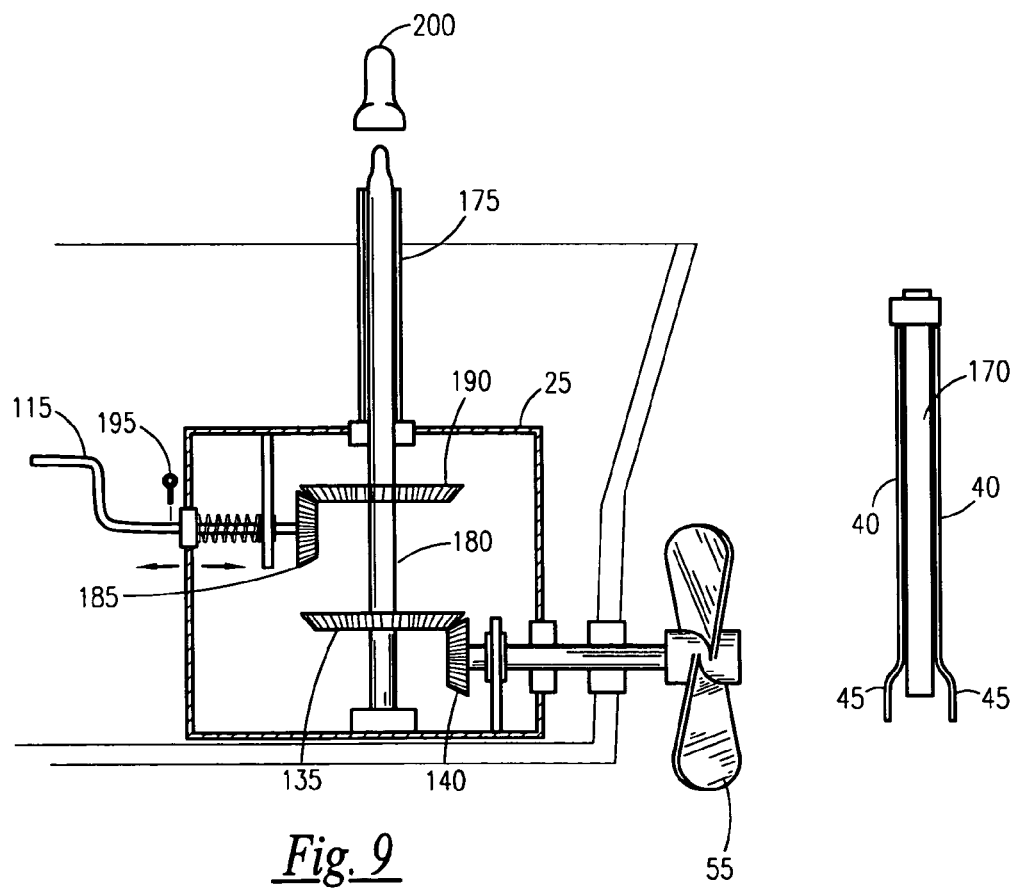
FIG. 9 is a cut-away side view of the gearbox housing and multi-shaft assembly that may be disassembled.

Referring now to FIG. 8 and FIG. 9, alternate embodiments are depicted, wherein FIG. 5 discloses the lever 115 operating as a hand crank so as to generate rotational energy to power the propellor 55. The lever/hand crank 115 is in mechanical communication with a small diameter gear 185, the small diameter gear 185 feeds a large diameter gear 190 at a 90 degree angle as shown. Rotational energy generated by the gears 185 and 190 are transferred or imparted down the lower shaft 180 so as to transfer or impart the rotational energy to gears 135 and 140, thereby rotating the propellor 55. The use of the lever 115 as a hand crank permits the propulsion of the boat or vessel 10 when air current and/or wind are negligible for propulsion via the arms 40 and corresponding cups 45.

In FIG. 9, another embodiment is depicted in which the lever or crank 115 is removable by release of a pin 195 inserted to impinge the crank 115 within the housing 25. In addition, the superior shaft 170 is removable from the intermediate shaft 175. The arms 40 are foldable so that the arms 40 lie parallel and adjacent with the superior shaft 170. The superior shaft 170 and the intermediate shaft 175 are coupled so that rotation of the superior shaft 170 imparts rotation on the intermediate shaft 175, thereby transferring or imparting rotational energy through to the inferior shaft 180 and through the sequence to the gears 135 and 140 and the propellor 55. A cap 200 is provided to fit over the top of the intermediate shaft 175 for protecting the interior of the intermediate shaft 175 and for an aesthetically pleasing appearance.

It is envisioned that other styles and configurations of the present invention can be easily incorporated into the teachings of the present invention, and only one particular configuration shall be shown and described for purposes of clarity and disclosure and not by way of limitation of scope.

2. Operation of the Preferred Embodiment

The preferred embodiment of the present invention can be utilized by the common user in a simple and effortless manner with little or no training. After purchase or procurement of the rotary wind-powered propulsion system for boats 10, it must be installed in a boat 15, though it is envisioned that some boat 15 could be manufactured with the rotary wind-powered propulsion system for boats 10 as an integral component. As aforementioned, the rotary wind-powered propulsion system for boats 10 would be made available in multiple sizes, thus ensuring the proper utilization, weight considerations, operating parameters, would be addressed with regards to the type and size of boat it is used upon. Once installed in general accordance with FIGS. 1 and 2, the rotary wind-powered propulsion system for boats 10 is ready for use.

To begin operation of the rotary wind-powered propulsion system for boats 10, the user would raise all four of the mast swing arms 35 to a horizontal position as shown in FIG. 1. At this point, should any wind be blowing, one of the wind cup 45 will be in a position to capture the wind via its concave surface 65, and the central hub 30 will be begin to rotate. This rotational power will be mechanically coupled to and transferred by the main vertical shaft 20 to the coupling 90, then the small shaft 95, and into the speed reduction mechanism 110 located inside the gear box housing 25. The user will then have the option of reducing the rotational energy using the speed adjustment lever 115. The resultant rotational power is transferred at a 20 to 1 ration through the large diameter gear 135 and the small diameter gear 140 where it powers the propellor 55 in a conventional manner. At this point in time, the boat 15 will begin to move forward in a direction governed by other control systems such as the rudder. It should be noted that a flexible coupling system or universal joint along the propellor shaft 145 would allow the direction of the boat 15 to be controlled as well. When docked or anchored, the above process is reduced for stowage purposes.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents. Therefore, the scope of the invention is to be limited only by the following claims.

What is claimed is:

1. A propulsion apparatus for a boat comprising:
a vertical shaft assembly axially rotatable, said shaft assembly having a superior shaft engaging an intermediate shaft, said intermediate shaft engaging an inferior shaft;
a hub affixed to said superior shaft, said hub having a plurality of arms radiating therefrom, each one of said arms having a wind cup at a distal end thereof, and a gearbox housing affixed to said boat, said gearbox housing mechanically coupling said intermediate shaft and said inferior shaft to a propellor;
a speed adjustment lever operatively engaging a speed reduction mechanism within said gearbox housing, said lever adjustable so that said mechanism reduces the rotational energy imparted by said shaft assembly;
said propellor external to said boat, said propellor having a propellor shaft operatively coupled to said inferior shaft;
wherein air strikes one of said wind cups and concomitantly rotates said hub and said shaft in the axial direction corresponding to the direction of said wind cup, the rotational energy generated by said shaft assembly is transferred through said gearbox and to said propellor to mobilize said boat.

2. The propulsion apparatus of claim 1, wherein said wind cups have a convex surface complimentary to an opposing concave surface, said concave surface capturing wind for axially displacing said arms and said hub.

3. The propulsion apparatus of claim 2, wherein said plurality of arms comprises three arms, said arms equidistant from adjacent said arms.

4. The propulsion apparatus of claim 3, wherein said wind cups are aligned facing in the same axial direction.

5. The propulsion apparatus of claim 2, wherein said plurality of arms comprises four arms, said arms equidistant from adjacent said arms.

6. The propulsion apparatus of claim 5, wherein said wind cups are aligned facing in the same axial direction.

7. The propulsion apparatus of claim 5, wherein said arms comprises:
a first arm, a second arm, a third arm and a fourth arm;
said first arm and said third arm co-axially aligned, said wind cups corresponding to said first arm and said third arm facing opposing compass directions; and
said second arm and said fourth arm co-axially aligned, said wind cups corresponding to said second arm and said fourth arm facing opposing compass directions.

8. The propulsion apparatus of claim 1, wherein said gearbox housing comprises:
a first bearing seal through which said intermediate shaft engages said inferior shaft;
a second bearing seal through which said lever engages said mechanism;
a third bearing seal through which said propellor shaft engages said inferior shaft; and
a support bearing seal at a base of said gearbox housing, said support bearing seal providing support to said shaft assembly.

9. The propulsion apparatus of claim 1, wherein said inferior shaft engages a large diameter gear engaging a small diameter gear, said small diameter gear engages said propellor shaft, and rotational energy imparted by said inferior shaft rotates said large diameter gear and said small diameter gear, thereby rotating said propellor shaft and said propellor, thereby propelling said boat.

10. A propulsion apparatus for a boat comprising:
a vertical shaft assembly axially rotatable, said shaft assembly having a superior shaft engaging an intermediate shaft, said intermediate shaft engaging an inferior shaft;
a hub affixed to said superior shaft, said hub having a plurality of arms radiating therefrom, each one of said arms having a wind cup at a distal end thereof;
said superior shaft removable from said shaft assembly, said arms foldable for parallel alignment with said superior shaft; and
a gearbox affixed to said boat, said gearbox mechanically coupling said intermediate shaft and said inferior shaft to a propellor;
a speed adjustment lever operatively engaging a small diameter gear engaging a large diameter gear, said large diameter gear engaging said inferior shaft, said lever turned for rotating said gears and imparting rotational energy along said inferior shaft to a propellor, said lever provided for occasions when air current is negligible for rotating said shaft assembly;
said propellor external to said boat, said propellor having a propellor shaft operatively coupled to said inferior shaft;
wherein air strikes one of said wind cups and concomitantly rotates said hub and said shaft in the axial direction corresponding to the direction of said wind cup, the rotational energy generated by said shaft assembly is transferred through said gearbox and to said propellor to mobilize said boat.

11. The propulsion apparatus of claim 10, wherein said wind cups have a convex surface complimentary to an opposing concave surface, said concave surface capturing wind for axially displacing said arms and said hub, said wind cups aligned facing in the same axial direction; and
said plurality of arms comprising three arms, said arms equidistant from adjacent said arms.

12. The propulsion apparatus of claim 10, wherein said wind cups have a convex surface complimentary to an opposing concave surface, said concave surface capturing wind for axially displacing said arms and said hub, said wind cups aligned facing in the same axial direction; and
said plurality of arms comprises four arms, said arms equidistant from adjacent said arms.

13. The propulsion apparatus of claim 10, wherein said gearbox housing comprises:
a first bearing seal through which said intermediate shaft engages said inferior shaft;
a second bearing seal through which said lever engages said mechanism;
a third bearing seal through which said propellor shaft engages said inferior shaft; and
a support bearing seal at a base of said gearbox housing, said support bearing seal providing support to said shaft assembly.

* * * * *